Patented Jan. 19, 1926.

1,570,553

UNITED STATES PATENT OFFICE.

ALEXANDER CLASSEN, OF AACHEN, GERMANY, ASSIGNOR TO THE COMMERCIAL ALCOHOL COMPANY, LIMITED, OF LONDON, ENGLAND, A BRITISH COMPANY.

PROCESS FOR THE MANUFACTURE OF CELLULOSE SOLUTIONS.

No Drawing. Application filed August 16, 1924. Serial No. 732,682.

*To all whom it may concern:*

Be it known that I, ALEXANDER CLASSEN, a citizen of Germany, residing at Aachen, Germany, have invented certain new and useful Improvements in a Process for the Manufacture of Cellulose Solutions, of which the following is a specification.

According to Willstätter's known proposition, (see U. S. Patent 1,141,510) cellulose-containing solutions are produced by the action of hydrochloric acid (above 39% concentration) with cellulose-containing matter. The proportion of hydrochloric acid required for carrying out the process is considerable. This high proportion gives rise to great difficulties as regards recovery of the acid and subsequent treatment of the cellulose solution, for example for conversion into glucose or alcohol. In the Willstätter process above referred to, cellulosic material, (e. g. cotton) can be kneaded with 12 to 15 parts of very highly concentrated hydrochloric acid, (say 1.209 sp. g. at 15° C.) until a viscous solution of cellulose is formed, a part of the HCl can then be removed from the solution by subjecting the same to a partial vacuum, after which the remaining solution can be squirted through a nozzle into water, to form a thread of regenerated (or reprecipitated) cellulose.

When even stronger acids are used, in place of 1.209 sp. g. (say 1.212 sp. g.) a somewhat more concentrated solution of cellulose can be secured. It appears however that in the Willstätter process a very great amount of very strong hydrochloric acid (s. g. about 7 parts of 39% HCl solution, per one part of cellulose) is required.

In accordance with the present invention I am able to dissolve the cellulose in substantially smaller amounts of actual HCl.

I have now found that the dissolving of cellulose in acids such as hydrochloric acid may be extraordinarily assisted and accelerated in the presence of contact substances, more particularly substances which under the circumstances are unaffected or substantially unaffected by the acid. Metals such as for example platinum and other metals of the platinum group, tungsten and the like, practically insoluble in hydrochloric acid, come first and foremost under consideration as contact substances. Metallic copper can serve the same purpose, but is less suitable therefor. Metals can be replaced, or used in addition to, metal alloys practically insoluble in hydrochloric acid, such as for example alloys of the platinum metals, ferrotungsten, ferrovanadium, ferromolybdenum, ferrotungsten-vanadium, silicides and so forth. A further usable alloy, termed Borchers metal, contains 60–65% nickel, 30–35% chromium, 2.5% tungsten and 0.2–1% silver. In this alloy nickel may be replaced for example by cobalt, tungsten for example by molybdenum and silver for example by copper. The contact substances are preferably added in a form in which they can be easily eliminated from the reaction products, for example in the form of sheets, rods or the like. In certain circumstances it is also possible to make the reaction vessel of contact substance material or of material containing the said substances, or it may be interiorly coated with such substances.

One of the advantages derived from the presence of contact substances is that a comparatively very small quantity of acid is sufficient for carrying out the dissolving process. As a rule, only 0.5 to 1 part of hydrochloric acid to one part of wood material is ample. In exceptional cases, as much as two parts of hydrochloric acid are used to one part of wood.

It has moreover been found of advantage to assist the action of hydrochloric acid (which is present in the liquid form) on cellulose by introducing hydrochloric acid gas in the process. The process may be carried out, as done by Willstätter, with hydrochloric acid at a higher concentration than 39%. However, acid at a lower concentration may be successfully used owing to the action of the contact substances, more particularly when hydrochloric acid gas is introduced. If for example saw-dust is moistened with moderately concentrated acid and if hydrochloric acid is allowed to react in the presence of contact substances such as above indicated, and preferably under agitation of the material, the temperature rises to 30° C. and more if the material is not cooled. These are conditions in which the formation of acid at a concentration of 39% and more is impossible. Dissolution however proceeds rapidly and smoothly owing to the co-operation of contact substances.

Finally it has been found advantageous to accelerate dissolution by using pressure. In the majority of cases, favourable results are obtained by resorting to comparatively low pressure such as for example up to 5 atmospheres or more which may be produced for example by means of a neutral gas.

*Example.*

One part of saw-dust with a proportion of water of 20 to 30% is mixed with one part of hydrochloric acid at any concentration. The moistened material is agitated at ordinary temperature under introduction of hydrochloric acid gas and in the presence of a contact substance as above described, which may be added in the form of pieces or sheet. The material is rapidly converted into pulp and then becomes liquid. The cellulose solution thus formed can be easily separated from undissolved lignin which is in finely divided form. Glucose is obtained by diluting the cellulose solution with water. Glucose may be obtained as such or may be converted into alcohol by fermentation. The yield is as high as 63%. Water may be used in place of hydrochloric acid for moistening the cellulose-containing initial material.

I call attention to the fact that while I have above, in the specific example, mentioned the use of the solution of cellulose for the production of glucose, it will be understood that the present invention involves the production of a solution of cellulose, which can thereafter be employed for any desired purpose.

I claim:

1. A process for the manufacture of cellulose solutions in concentrated hydrochloric acid, consisting in causing hydrochloric acid to act at a moderate temperature upon material containing cellulose in the presence of metallic contact substances which are not readily attacked by hydrochloric acid.

2. A process for the manufacture of cellulose solutions in concentrated hydrochloric acid, consisting in causing concentrated hydrochloric acid to act at a moderate temperature upon material containing cellulose in the presence of metallic contact substances which are not readily attacked by hydrochloric acid.

3. A process for the manufacture of cellulose solutions in concentrated hydrochloric acid, consisting in causing hydrochloric acid to act at a moderate temperature upon material containing cellulose in the presence of metallic contact substances which are not readily attacked by hydrochloric acid, gaseous hydrochloric acid being introduced during the said treatment.

4. A process for the manufacture of cellulose solutions in concentrated hydrochloric acid, consisting in moistening material containing cellulose with hydrochloric acid of a concentration which does not suffice to dissolve the cellulose, such treatment being conducted in the presence of a metallic contact substance which is not readily attacked by hydrochloric acid, and introducing gaseous hydrochloric acid until the cellulose is converted into a solution.

5. A process for the manufacture of cellulose solutions in concentrated hydrochloric acid consisting in treating moist material containing cellulose in the presence of metallic catalysts which are not readily attacked by hydrochloric acid, with gaseous hydrochloric acid until the cellulose is converted into a solution.

6. A process for the manufacture of cellulose solutions in concentrated hydrochloric acid, consisting in causing hydrochloric acid to act at a moderate temperature upon material containing cellulose in the presence of a metallic catalyst which is not readily attacked by hydrochloric acid, and in aiding the dissolving process by agitating the material.

7. A process for the manufacture of cellulose solutions in concentrated hydrochloric acid, consisting in causing hydrochloric acid to act at a moderate temperature upon material containing cellulose in the presence of a metallic catalyst which is not readily attacked by hydrochloric acid, such process being conducted under pressure above atmospheric.

8. A process for the manufacture of cellulose solutions in concentrated hydrochloric acid, consisting in causing hydrochloric acid to act at a moderate temperature upon material containing cellulose in the presence of a metallic catalyst which is not readily attacked by hydrochloric acid, not more than two parts of the liquid being used to one part of the material containing cellulose.

9. A process for the manufacture of cellulose solutions, which comprises causing an acid to act as a solvent upon cellulose-containing material at moderate temperatures in the presence of a substance which acts as a catalyst to aid said cellulose-dissolving action.

10. A process which comprises acting upon a cellulosic raw material with a relatively small amount of an agent which will by itself dissolve cellulose only if used in a much greater amount, while in the presence of a material which acts as a catalyst to aid solution of the cellulose in said agent.

11. A process which comprises acting upon a cellulosic raw material with a relatively small amount of an agent which will by itself dissolve cellulose only if used in a much greater amount, while in the presence of a metallic substance which is not readily dissolved by said agent but which acts as a catalysts to aid solution of the cellulose in said agent.

12. A process which comprises acting upon a cellulosic raw material with a relatively small amount of an agent which will by itself dissolve cellulose only if used in a much greater amount, while in the presence of a metal of the platinum group.

13. A process for the manufacture of cellulose solutions, which comprises causing an acid to act as a solvent upon cellulose-containing-material at moderate temperature in the presence of a metal which acts as a catalyst for the dissolving action but which is substantially unaffected by the acid used.

14. A process for the manufacture of cellulose solutions, which comprises causing hydrochloric acid to act as a solvent upon cellulose-containing-material, in the presence of a metal of the platinum group.

15. A process which comprises causing hydrochloric acid to act as a solvent on cellulose-containing-material, the amount of such acid being substantially less than 7 parts of hydrochloric acid solution of 39% strength to 1 part of cellulose, such action being conducted in the presence of a material which acts as a catalyst to aid the dissolving action of the hydrochloric acid on the cellulose.

16. A solution of cellulose in an acid, the amount of said acid corresponding to very substantially less than 7 parts of hydrochloric acid solution of 39% strength, to one part of cellulose.

17. A solution of cellulose in hydrochloric acid, the amount of such acid being substantially less than 7 parts of hydrochloric acid of 39% strength, to one part of cellulose.

In testimony whereof I affix my signature.

ALEXANDER CLASSEN.